T. SPILLANE.
APPARATUS FOR DRAWING GLASS.
APPLICATION FILED AUG. 2, 1909.
1,031,883.
Patented July 9, 1912.
2 SHEETS—SHEET 1.
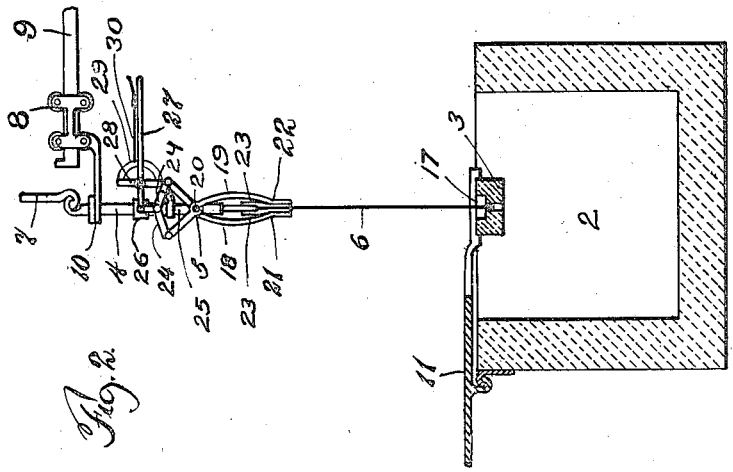
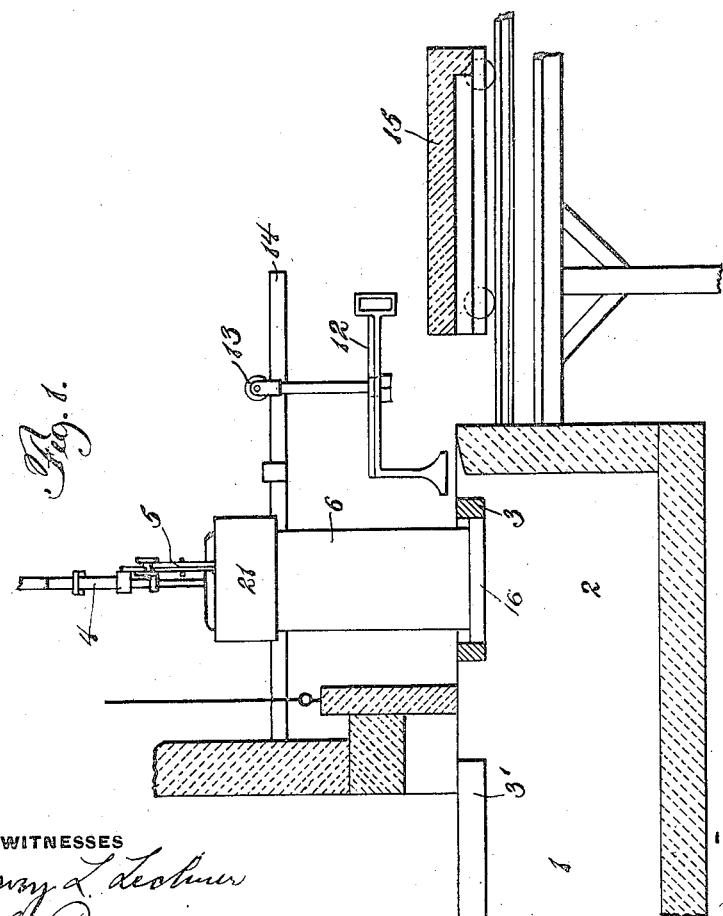
WITNESSES
INVENTOR T. SPILLANE.
APPARATUS FOR DRAWING GLASS.
APPLICATION FILED AUG. 2, 1909.
1,031,883.
Patented July 9, 1912.
2 SHEETS—SHEET 2.
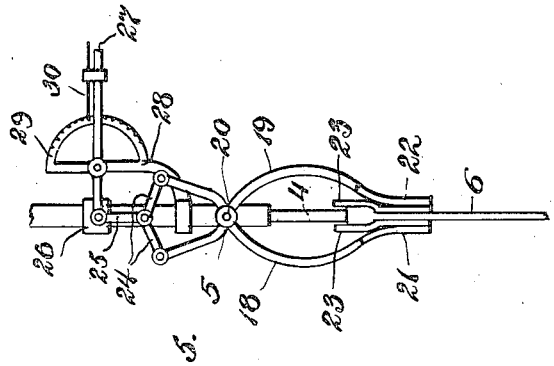
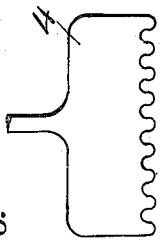
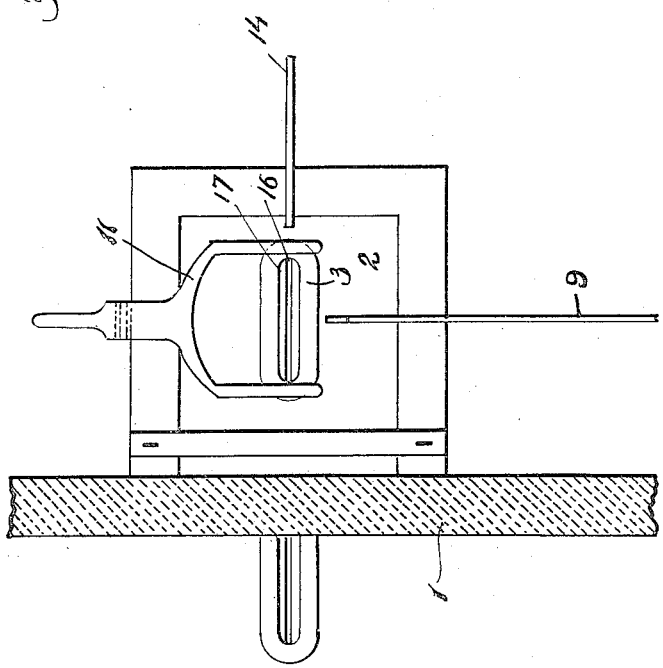
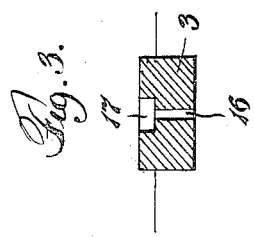
WITNESSES
INVENTOR

UNITED STATES PATENT OFFICE.

THOMAS SPILLANE, OF NEW BETHLEHEM, PENNSYLVANIA.

APPARATUS FOR DRAWING GLASS.

1,031,883.　　　　　Specification of Letters Patent.　　Patented July 9, 1912.

Application filed August 2, 1909. Serial No. 510,747.

*To all whom it may concern:*

Be it known that I, THOMAS SPILLANE, a citizen of the United States, residing at New Bethlehem, in the county of Clarion and State of Pennsylvania, have invented certain new and useful Improvements in Apparatus for Drawing Glass, of which the following is a specification.

The invention relates to apparatus for drawing glass, and particularly to apparatus for drawing sheet glass direct from a drawing tank. The invention has for its objects the provision of an improved form of segregating means or drawing ring, and the provision of improved means for handling the sheet after the drawing is started and avoiding the danger of the glass cracking from the bait.

One embodiment of the invention is illustrated in the accompanying drawings, wherein—

Figure 1 is a longitudinal section through a furnace to which the improved drawing construction is applied;

Figure 2 is a section through the furnace taken at right angles to the section of Figure 1;

Figure 3 is an enlarged detail section through the drawing ring or segregating member;

Figure 4 is a partial plan view of the apparatus shown in Figures 1 and 2;

Figure 5 is an enlarged detailed elevation of the bait and sheet clamping means thereon, and Figure 6 is an enlarged detailed side elevation of the lower portion of the bait.

Referring first to the general arrangement shown in Figures 1, 2, and 4; 1 is the melting tank, which may be of any approved form; 2 is the drawing tank or dog house as it is usually called, which dog house projects from the front of the melting tank and communicates therewith; 3 is one of a plurality of drawing rings or segregating members, which members are adapted to float upon the body of glass, and are successively passed through the melting tank to drawing position, as indicated in Figures 1 and 2; 4 is the bait preferably shaped at its lower end as indicated in Figure 6; 5 is a clamping means mounted upon the bait and adapted to grip the edge of the sheet of glass beneath the lower edge of the bait; 6 is the sheet of glass in process of drawing; 7 is an elevating or lifting member which is detachably hooked to the upper end of the bait handle; 8 is a trolley mounted for movement upon a track 9, and provided with a forked end 10 adapted to engage a collar upon the handle of the bait; 11 is an operating lever for depressing the segregating members for a purpose to be hereinafter described; 12 is a pair of tongs mounted for movement upon the trolley 13 carried by the track 14 and adapted to remove the members 3 from the drawing tank after the drawing operation is completed; and 15 is a cover for the drawing tank, which cover 15 is mounted upon wheels and is adapted to be moved forward to cover the drawing tank when the apparatus is not in use.

The form of segregating member 3 or drawing ring constitutes one feature of my invention and is shown most clearly in Figures 3 and 4. This member is preferably of oblong shape and is provided with a slot having a lower narrow portion 16 and an upper enlarged portion 17, the ring or member being so arranged that normally the glass in the tank rises to the bottom of the portion 17 but does not enter such portion. Before the bait is dipped into the glass in the ring or member, such member is depressed by means of the lever 11 until the glass fills the enlarged portion 17. The edge of the bait is then inserted into the enlarged portion and the drawing started, after which time the inner end of the lever 11 is moved up to permit the member 3 to rise so that the glass reaches only the upper edge of the part 16. This form of drawing ring is advantageous in that the enlarged portion of the slot provides for the ready insertion of the bait without contact with the ring, and serves the further purpose of segregating a portion of the glass from the main body preliminary to drawing, whereby the glass is permitted to cool slightly and become sufficiently viscous for successful drawing. After the drawing is started the narrow portion of the slot serves as a guide, and because of its limited width the glass passing therethrough is maintained at a sufficiently low temperature to secure proper drawing.

The clamping means which constitutes another feature of my invention, is shown in Figure 5 most clearly. This clamping means comprises a pair of arms 18 and 19 pivoted at 20 to the handle of the bait and carrying at their lower ends laterally extending portions 21 and 22 for gripping the upper edge of the glass sheet. These end portions 21 and 22 are preferably provided with a facing of asbestos 23 or other suitable yielding material which extends upwardly a slight distance above the joint between the edge of the bait and the glass. The upper ends of the arms 18 and 19 are provided with the toggle links 24 pivotally connected to an operating link 25, and this link 25 is secured at its upper end to the collar 26 slidably mounted upon the handle of the bait. This collar is moved up and down to swing the arms 18 and 19 inward and outward by means of a handle 27 pivoted upon the bracket 28, which bracket is secured to the handle of the bait. The bracket 28 is provided with a toothed sector 29 with which the locking member 30 upon the handle 27 coöperates to lock such handle in any desired position. The clamping device not only serves to support the sheet in case it cracks from the bait during the drawing operation, but also reduces the liability of such cracking, by reason of the overlapping base portion 23 holding the teeth of the bait and glass and thus preventing too rapid cooling.

After the bait has been dipped in the glass in the drawing member 3 and the drawing of the sheet started, the handle 27 is operated to cause the clamping members to grip the sheet beneath the edge of the bait, and during the rest of the drawing operation the sheet is supported not only by reason of its engagement with the bait but also by such clamping members. After the sheet 6 has attained a proper length the glass is severed adjacent the member 3, by means of a pair of shears or other suitable means, and the fork 10 on the trolley 8 brought into the position shown in Figure 2, and the drawing member 7 lowered in order to unhook it from the handle of the bait. The trolley is then moved along the rail 9, and the sheet of glass carried into a leer. The drawing ring 3 is then removed from the drawing tank by means of the tongs 12 and a new ring 3' brought into position in the drawing tank. Another bait is then attached to the drawing hook 7 and the operation repeated as before.

Having thus described my invention and illustrated its use, what I claim as new and desire to secure by Letters Patent, is the following:

1. Apparatus for drawing sheet glass comprising a drawing receptacle, a bait, and a segregating member 3 supported at the surface of the glass and having a slot 16 of slightly greater width than the sheet to be drawn and provided with an enlargement 17 of sufficient width to receive the edge of the bait, the said member 3 lying with the enlargement 17 above the surface of the glass in the receptacle when unacted upon externally, and means for depressing the member 3 whereby the glass fills the enlargement 17.

2. Apparatus for drawing glass articles comprising a drawing member, means for moving the drawing member upwardly, a bait carried by the drawing member, and opposing clamping members secured to the drawing member and adapted to grip the glass below the bait.

3. Apparatus for drawing glass articles, comprising a bait and clamping members mounted to move with the bait and having gripping means for engaging the glass below the bait and extending to a point above the line of joinder between the glass and bait.

4. Apparatus for drawing glass articles, comprising a bait and clamping members mounted to move with the bait and having gripping means for engaging the glass, provided with upwardly projecting shielding means covering the joint between the bait and glass.

5. Apparatus for drawing glass sheets, comprising elevating means, a bait detachably carried thereby, and clamping means comprising a pair of gripping members pivotally mounted on the bait and adapted to engage the glass sheet beneath the bait, and means for operating the gripping members.

In testimony whereof I have hereunto signed my name in the presence of the two subscribed witnesses.

THOMAS SPILLANE.

Witnesses:
   J. Dom Hulsman,
   W. T. A. Craig.